US012689709B2

(12) United States Patent
Keating et al.

(10) Patent No.: US 12,689,709 B2
(45) Date of Patent: Jul. 21, 2026

(54) AUDIO QUALITY MAPPING AND ORIENTATIONAL FEEDBACK IN VIDEO CONFERENCING

(71) Applicant: Cisco Technology, Inc., San Jose, CA (US)

(72) Inventors: Fergal Keating, Carlow (NO); Wayne Elmer Moorefield, Jr., Apex, NC (US); Bjorn Winsvold, Tranby (NO)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 18/240,125

(22) Filed: Aug. 30, 2023

(65) Prior Publication Data
US 2025/0080694 A1     Mar. 6, 2025

(51) Int. Cl.
*H04N 7/15*         (2006.01)
*H04N 7/14*         (2006.01)
(52) U.S. Cl.
CPC ............. *H04N 7/152* (2013.01); *H04N 7/147* (2013.01)
(58) Field of Classification Search
CPC .......... H04N 7/152; H04N 7/147; H04N 7/15; H04N 7/157; H04N 7/141; H04N 7/14
USPC ...................................................... 348/14.09
See application file for complete search history.

(56) References Cited

U.S. PATENT DOCUMENTS

| | | | | |
|---|---|---|---|---|
| 9,338,544 | B2 | 5/2016 | Sun et al. | |
| 11,450,095 | B2 | 9/2022 | Anderton-Yang | |
| 11,462,236 | B2 * | 10/2022 | Bryan ................. | G10L 21/0216 |
| 2009/0204922 | A1 * | 8/2009 | Bhattacharjee ..... | H04L 12/1827 715/771 |
| 2011/0096137 | A1 | 4/2011 | Baker et al. | |
| 2022/0329960 | A1 | 10/2022 | Yagev et al. | |
| 2023/0156124 | A1 | 5/2023 | Li et al. | |

OTHER PUBLICATIONS

"Zoom Analytics", online: https://explore.zoom.us/en/zoom-analytics/, accessed Aug. 30, 2023, 16 pages.
Renze, Matthew, "AI for Audio Analysis", online: https://matthewrenze.com/articles/ai-for-audio-analysis/, accessed Aug. 30, 2023, 6 pages.
"Select a camera mode on Board, Desk, and Room Series", online: https://help.webex.com/en-us/article/ltrv3c/Select-a-camera-mode-on-Board,-Desk,-and-Room-Series, accessed Aug. 30, 2023, 6 pages.

* cited by examiner

*Primary Examiner* — Yosef K Laekemariam
(74) *Attorney, Agent, or Firm* — Lee & Hayes, P.C.

(57)         ABSTRACT
In one embodiment, a method is disclosed comprising: monitoring, by a device and during a video conferencing session in a video conferencing area, audio quality of audio collected from a subject participating in the video conferencing session; detecting, by the device and based on the audio quality, an audio quality issue for the audio collected from the subject; generating, by the device, an orientation instruction predicted to mitigate the audio quality issue based on an audio quality visualization map generated from historical audio quality data in the video conferencing area; and providing, by the device and during the video conferencing session, the orientation instruction to the subject.

20 Claims, 10 Drawing Sheets

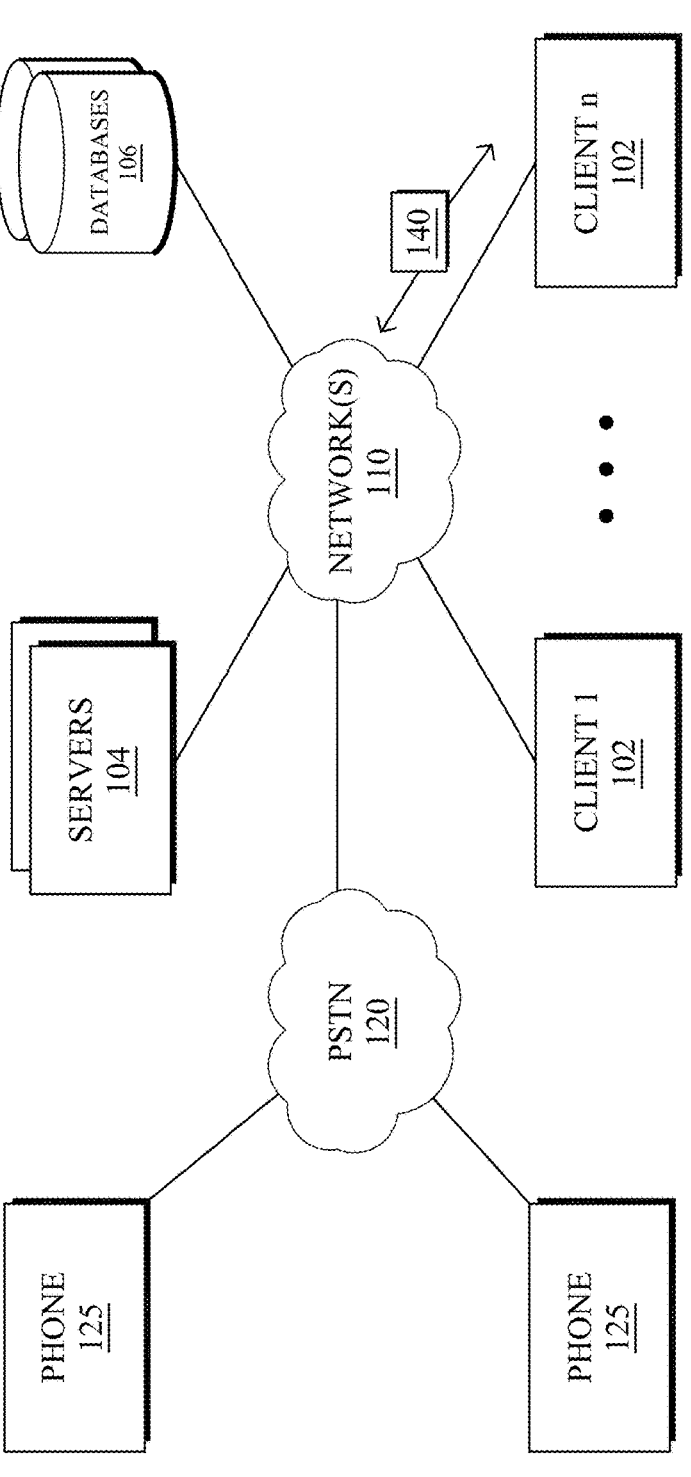
FIG. 1

300

COLLABORATION
ENDPOINT
302

CAMERA(S) 308

SPEAKER(S) 306

DISPLAY 304

Connecting...

312

CONTROL DISPLAY
310

500

FEEDBACK PROCESS 248

QUALITY MONITORING MANAGER 502

MAPPING MANAGER 504

FEEDBACK MANAGER 506

600

| CATEGORY | DESCRIPTION | SYSTEM ACTION |
|---|---|---|
| Inaudible | A potential presenting participant has been detected by the video system, but no audio is detected, and the system is unmuted | Send warning that audio is not detected and/or send orientation instruction |
| Audible Level 1 | The audio level is low and speech detection/recognition has low performance/ high error rate | Send warning that audio level is low and/or send orientation instruction |
| Audible Level 2 | The audio level is low, but speech detection/recognition is accurate | Send warning that audio could be improved and/or send orientation instruction |
| Audible Level 3 | The audio level is within an optimal range and speech detection/recognition is optimal☐ | Display audio quality detection |
| Audible Level 4 | The audio level has met or exceeded a high threshold and speech detection/recognition is optimal | Send warning that audio level is high and/or send orientation instruction |
| Audible Level 5 | The audio level has met or exceeded a high threshold, noise is detected, and/or speech detection/recognition is sub-optimal | Send warning that audio level is high and/or send orientation instruction |

WARNING:
LOW AUDIO
QUALITY
DETECTED!
MOVE FORWARD
904

312

704-1

704-2

902-1

702-1

902-N

700

AUDIO QUALITY MAPPING AND ORIENTATIONAL FEEDBACK IN VIDEO CONFERENCING

TECHNICAL FIELD

The present disclosure relates generally to computer networks, and, more particularly, to audio quality mapping and orientational feedback in video conferencing.

BACKGROUND

Video conferencing has transformed the way the world lives, works, and communicates. Video conferencing has achieved this transformation by facilitating virtual collaboration among geographically dispersed people using little more than a network connection and video conferencing equipment. As the adoption of video conferencing expands, video conferencing application developers strive to include features that make the video conferencing experience more adaptive, immersive, and customizable.

Ensuring optimal audio quality alongside visual clarity has consistently posed a hurdle in the realm of video conferencing. Specifically, the static nature of microphone setups and other video conferencing equipment stands in stark contrast to the fluidity of the environment they operate within. As participants move around, assume different positions, and adjust their orientations, the stationary equipment configurations struggle to consistently capture and deliver clear audio. This discrepancy is further compounded by the dynamic nature of acoustic conditions-areas within the same room might exhibit varying noise levels, background sounds, and reverberations which can also be impacted based on how the room is occupied and/or utilized. The result is an intricate web of dynamic challenges that undermines the consistent audio capture essential for effective communication. Frequently, a presenter remains unaware of the deterioration in their audio capture quality, let alone being equipped to pinpoint its source or implement effective remedies.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example of a simplified computing system;

FIG. 6 illustrates an example table for audio quality levels and corresponding system actions;

DESCRIPTION OF EXAMPLE EMBODIMENTS

Overview

Figure 2:
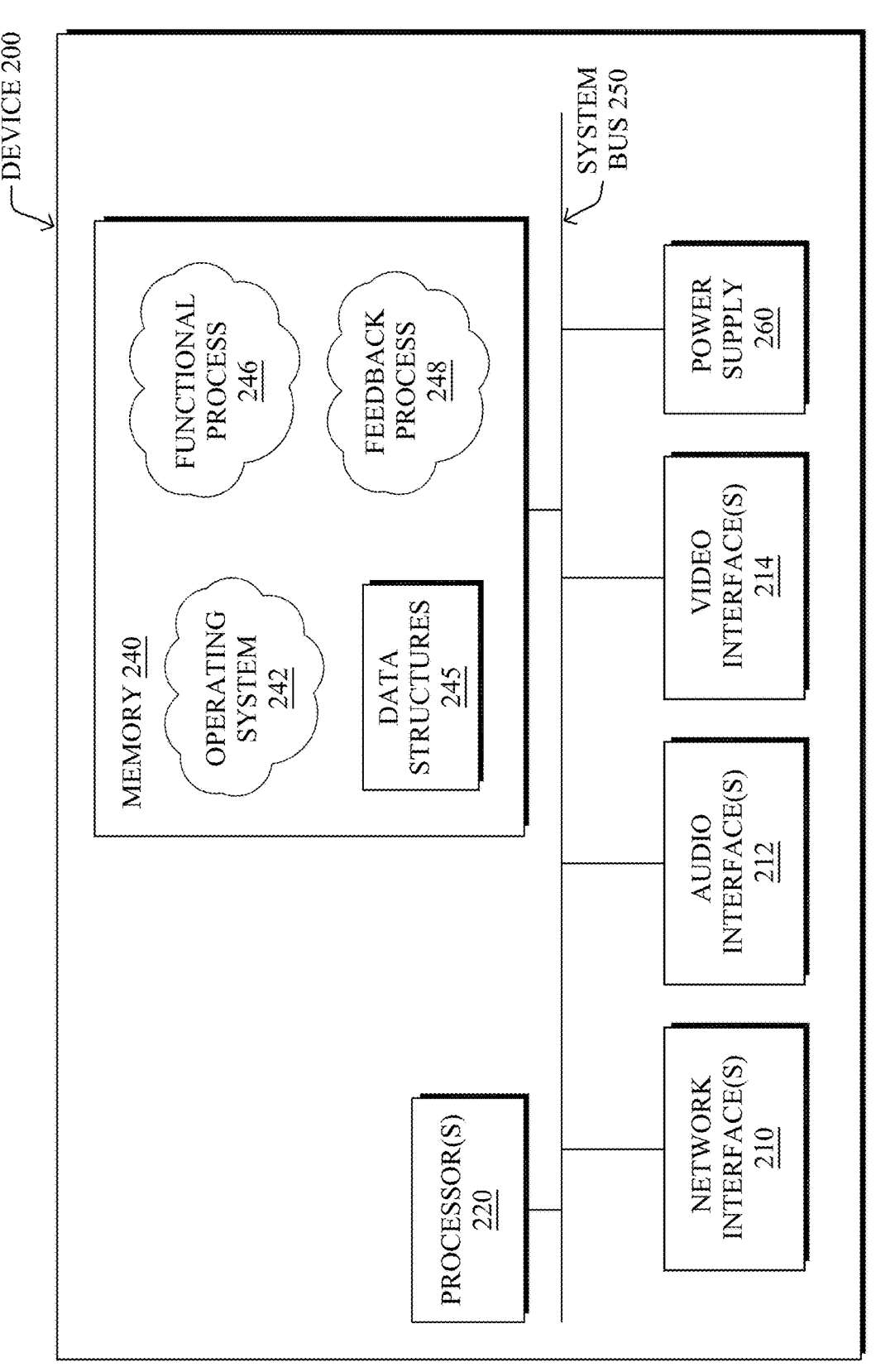
FIG. 2 illustrates an example of a node/device.

According to one or more embodiments of the disclosure, a method may include: monitoring, by a device and during a video conferencing session in a video conferencing area, audio quality of audio collected from a subject participating in the video conferencing session; detecting, by the device and based on the audio quality, an audio quality issue for the audio collected from the subject; generating, by the device, an orientation instruction predicted to mitigate the audio quality issue based on an audio quality visualization map generated from historical audio quality data in the video conferencing area; and providing, by the device and during the video conferencing session, the orientation instruction to the subject.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system (e.g., computing system 100) illustratively comprising any number of client devices (e.g., client devices 102) (e.g., a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to pre-defined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN 120) may also be considered to be a part of computing system 100, namely where phones 125 connect to the PSTN 120 in a standard manner (e.g., landlines, cellphones, and so on). The PSTN may be based on any number of carrier telephone networks which provide a connection to computer network (e.g., network(s) 110) for things such as conference calls, video calls, calls to voice over IP (VOIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

FIG. 2 is a schematic block diagram of an example node/device (e.g., device 200) that may be used with one or more embodiments described herein, e.g., as any of the devices 102-106 shown in FIG. 1 above. Device 200 may also be any other suitable type of device depending upon the type of network architecture in place, such as a collaboration endpoint, "receiver" (herein), etc. Device 200 may comprise one or more network interface (e.g., network interfaces 210), one or more audio interfaces (e.g., audio interfaces 212), one or more video interfaces (e.g., video interfaces 214), one or more processors (e.g., processor(s) 220), and a memory 240 interconnected by a system bus 250, and is powered by a power supply 260.

The network interfaces 210 include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area within which the device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via network interfaces 210. Such cameras may be mechanically controlled, in some instances, to allow for repositioning of the camera, automatically.

Memory 240 comprises a plurality of storage locations that are addressable by the processor(s) 220 and the network interfaces 210 for storing software programs and data structures associated with the embodiments described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes (e.g., functional process 246), and on certain devices, an illustrative process (e.g., feedback process 248), as described herein. Notably, functional process 246, when executed by processor(s) 220, cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, functional process 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via network interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
FIG. 3 illustrates an example of a meeting room in which a collaboration endpoint is located.

For instance, FIG. 3 illustrates an example meeting room 300 in which a collaboration endpoint 302 is located, according to various embodiments. During operation, collaboration endpoint 302 may capture video via its one or more cameras (e.g., cameras 308), audio via one or more of an audio capture device 312 (e.g., a microphone), and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a video conference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
FIG. 4 illustrates an example of a display of a virtual meeting.

In addition, FIG. 4 illustrates an example display 400 of a virtual meeting (or a video conference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

In some examples, the presenter 404 may be presented with a virtual background image. That is, the video feed of the presenter 404, with the physical background removed, may be presented superimposed over a virtual background.

In some instances, the presenter 404 may be presented in an extended reality (XR) format, such as a holographic image. In such instances, only the presenter 404, with physical background removed, may be presented as a hologram.

Other styles, configurations, and operations of web conferences, presentations, calls, and so on may be understood by those skilled in the art, and those shown and described above are merely examples that are not meant to be limiting to the scope of the present disclosure.

Audio Quality Mapping and Orientational Feedback in Video Conferencing

As noted above, high quality audio capture and delivery in video conferencing is complicated by a range of dynamic factors. For instance, during a video conference, participants typically do not remain completely stationary and/or optimally positioned within a sweet spot (e.g., a specific location or orientation where the microphone captures sound with optimal quality) of an audio capture device. In addition, some participants may have a softer speaking voice which is not able to be picked up by an audio capturing device as well as similarly positioned participants with louder speaking voices.

Further, some conferencing areas may include background noise (e.g., from other people, other objects, signal interference, etc.) that may affect different parts of a conferencing area differently and/or may change depending on how the room is occupied and/or utilized. Furthermore, as occupancy and/or arrangement of a room and/or its object changes, so too may the acoustic qualities of the conferencing and/or the ability of audio capturing equipment to detect sound in the conferencing area. Say, for example, a participant leans toward a conference table where a microphone is located causing their body to be positioned between another participant and the microphone. This physical interference may cause the other participants' voice to be muffled as captured by the microphone.

Regardless of the exact conditions causing a degradation in the quality of audio being captured in the conference area, the effect is the same: remote participants receive poor quality and/or unintelligible audio. Obviously, this negatively impacts the efficacy and/or user experience of video conferencing when a portion of the participants are not able to adequately hear or understand what other participants are trying to communicate. The result is frustrated participants, lower adoption/retention rates, and/or increased network resource utilization spent repeating and remediating misunderstandings.

Current efforts to avoid these outcomes rely on extensive pre-configuration routines for manually pre-calibrating video conferencing equipment to a conferencing space. For example, when setting up a conference room and/or preparing for a video conference, participants may painstakingly position and reposition video capturing devices, audio capturing devices, themselves, etc. and/or adjust the settings of the various equipment until they arrive at a configuration that seems to provide high quality audio/video capture and/or delivery. However, the resulting configurations are necessarily static ones. That is, the configurations are tailored to the static orientation and/or acoustic properties of the room at the time of the pre-calibration without regard to how orientations and conditions have changed.

Once a video conferencing session starts, participants may begin to file into the video conferencing area and position themselves and their equipment. Therefore, sources of background noise, interference, acoustic shaping, etc. may be introduced. As such, the acoustic properties of the room may be fundamentally different altered from pre-calibration as a result.

Further complicating matters, a presenting participant may move around and/or alter their orientation relative to the video conferencing equipment as they are presenting. As a result, they may no longer be in the orientation that they were at the time of the pre-calibration. Therefore, despite painstakingly tuning the video conferencing equipment to the audio conditions of the room at a static moment in the past, the pre-calibration is unlikely to hold up when applied to the highly dynamic real world video conferencing scenarios. The result will be degraded and/or unpredictable audio quality.

Inopportunely, the audio quality fluctuation and/or degradation issues will not be uncovered until during the video conference when the audio quality drops. Unfortunately, this is the most inopportune time for them to materialize since effective communication in video conferencing relies on capture and delivery of clear and understandable audio.

Perhaps worse still is that the presenter is typically unaware that the audio quality of their presentation is suffering during a video conferencing session. Afterall, they are not receiving or hearing the audio of their own presentation. Frequently, even when audio quality issues arise other participants decline to point out the audio troubles out of fear of appearing impolite for interrupting and/or fear that the audio quality issues may be a result of a malfunction of the network or of their own equipment.

Even when the issue is finally raised, the presenter is typically at a loss as to how to remediate these issues. After all, they are usually operating under the assumption that their video conferencing equipment is precisely pre-calibrated to the conditions of the video conferencing area and fail to realize how the conditions have changed. Often, this can lead to the presenter embarrassingly fumbling through a series of trial-and-error remediation attempts that ultimately do little to remediate the issue. For example, a simple remedial measure such as adjusting gain to improve detection of low voices may seem like a reasonable option, but it will only make things worse in a room full of people with lots of background noise. Ultimately, the presenter is simply not equipped with real-time knowledge of their audio quality nor with any information that might help identify the source of audio quality issues or how they may best be remediated.

In contrast, the techniques herein provide audio quality mapping and real-time orientational feedback in video conferencing sessions. This empowers users with the real-time intelligence necessary to eliminate audio quality and/or remedial blind spots. For instance, these techniques can incorporate speech detection, speaker detection, and audio level recognition to uniquely categorize audio quality and provide instant feedback to in room participants as a video conference unfolds. Moreover, these techniques build intelligence by logging data about the acoustic characteristics of a conferencing area which can be incorporated into an audio quality visualization map of the video conferencing area and/or its acoustic characteristics.

The techniques may be leveraged to provide orientation instructions, predicted to mitigate an audio quality issue based on such mappings, to presenters in real-time during the video conference. As a result, the presenter may be informed of audio quality issues in real-time and seamlessly respond by reorienting/reconfiguring themselves, others, equipment, equipment settings, etc. according to automatically provided data-based orientation instructions.

Specifically, according to one or more embodiments of the disclosure as described in detail below, a device may monitor, during a video conferencing session in a video conferencing area, audio quality of audio collected from a subject participating in the video conferencing session. The device may detect, based on the audio quality, an audio quality issue for the audio collected from the subject. The device may generate an orientation instruction predicted to mitigate the audio quality issue based on an audio quality visualization map generated from historical audio quality data in the video conferencing area. The device may provide orientation instructions to the subject during the video conferencing session.

Illustratively, the techniques described herein may be performed by hardware, software, and/or firmware, such as in accordance with feedback process 248, which may include computer executable instructions executed by the processor(s) 220 (or independent processor of network interfaces 210) to perform functions relating to the techniques described herein.

Figure 5:
FIG. 5 illustrates an example architecture for audio quality mapping and orientation feedback.

Operationally, according to various embodiments, FIG. 5 illustrates an example architecture 500 for audio quality mapping and orientational feedback in video conferencing sessions. At the core of architecture 500 is feedback process 248, which may be executed by one or more devices that provide and/or interface with a video conferencing service in a network, or another device in communication therewith. In general, feedback process 248 may be executed to provide audio quality mapping and real-time audio quality feedback to a participant during a video conferencing session and, therefore, may be executed on any device associated with the collection and/or delivery of the video conferencing session.

As shown, feedback process 248 may include quality monitoring manager 502, mapping manager 504, and/or feedback manager 506. As would be appreciated, the functionalities of these components may be combined or omitted, as desired. In addition, these components may be implemented on a singular device or in a distributed manner, in which case the combination of executing device can be viewed as their own singular device for purposes of executing feedback process 248.

During execution, quality monitoring manager 502 may manage audio quality monitoring in a video conferencing area. The video conferencing area may include a physical environment where a video conference is attended. This may include an office, a video conferencing conference room, etc. In various embodiments, the video conferencing area may include a briefing room where there is typically one presenting participant presenting to both a local audience in the video conferencing area and a remote audience. The video conferencing area may be an area such as example meeting room 300 in which a collaboration endpoint 302 and/or supporting equipment are located as illustrated in FIG. 3.

Quality monitoring manager 502 may cause the quality of the audio being captured from the conferencing area to be monitored. Monitoring the audio quality may include monitoring the audio being captured from different participants in the conferencing area as they speak. Specifically, the quality of the audio capture of a specific participant's voice as they are speaking in the conferencing area may be monitored by quality monitoring manager 502.

Monitoring the audio quality may involve detecting sound, such as speech, emanating from a particular participant amongst others as well as identifying where that participant is within the video conferencing area as they are making the sound. For instance, quality monitoring manager 502 may perform sound source localization based on data collected from one or more of a microphone, a camera, and/or another sensor within the conferencing area. For example, combined data from a microphone and a camera may be used to identify a particular participant as a presenting participant, identify that the particular participant is a sound source for captured audio, and/or identifying where that particular participant is located and/or how that particular participant is physically oriented with a conferencing area. These identifications can involve, directional audio detections, voice/image synchronizations, personalized voice recognition based on voice patterns or other forms of individual identification, facial or other feature recognition, body orientation detection, etc.

In addition, monitoring the audio quality may involve performing speech detection. Performing speech detection may include recognizing sound emanating from a participant as speech (e.g., by voice activity detection, spectral analysis, machine learning model application, hidden Markov model application, zero crossing rate analysis, energy-based approaches, statistical modeling, pitch analysis, etc.).

In some instances, monitoring the audio quality may include performing automated speech recognition or speech-to-text operations to convert spoken language into a textual representation of the spoken language. For example, feature extraction, acoustic modeling, language modeling, and decoding may be applied to audio input in order to output a text transcript that represents the spoken language captured in the input audio.

Further, monitoring the audio quality may include analyzing various aspects of an audio signal to determine its level, fidelity, clarity, and/or overall perceptual quality. For example, an energy level analysis, volume analysis, echo and/or reverberation time analysis, signal-to-noise ratio analysis, distortion and clipping analysis, frequency response analysis, dynamic range analysis, spectral analysis, background noise analysis, speech intelligibility metrics, perceptual audio quality metrics, temporal analysis, jitter and latency analysis, phase coherence analysis, background noise reduction analysis, etc. may be performed on the audio captured from the speech of a participant in order to determine its level, fidelity, clarity, and/or overall perceptual quality. In some instances, the level, fidelity, clarity, and/or overall perceptual quality of captured audio may be determined by subjecting the audio capture to customized machine learning models trained in making such determinations.

In various embodiments, monitoring the audio quality may include categorizing the audio captured within a video conferencing area during a video conference session. Categorizing the audio quality may include characterizing the captured audio into an audibility level category of a range of preconfigured audibility level categories. The particular audibility level category into which an audio capture is characterized may be determined based on one or more of the aforementioned audio quality metrics (e.g., associated with level, fidelity, clarity, overall perceptual quality, etc.) determined for an audio capture of a participant's voice in the video conferencing area. Further, the audio quality categorization may be based on one or more of an audio level, speech detection/recognition results, speaker tracking results, etc. as compared to one or more threshold values.

For example, an audio capture from a video conferencing area may be categorized into one or more of the audibility level categories described in Table 600 of FIG. 6. The categorization may be based on a comparison of the audio quality metrics for the capture to one or more threshold values associated with those metrics. In various embodiments, the categorization of an audio capture in a particular category may be associated with a degree of certainty or confidence in that categorization. The degree of certainty or confidence may influence a categorization and/or whether or which system actions are taken in response to a categorization. In some instances, a determination that the audio quality of an audio capture transitioned from one audibility level category to another may bestow a greater degree of certainty to the categorization and the triggering of a corresponding system action.

As previously mentioned, categorization of the audio capture into a particular audibility level category may be utilized to trigger a system action. For example, each category in a range of pre-configured categories may be associated with a corresponding system action. In some instances, system actions may include making automated adjustments to video conferencing equipment (e.g., adjusting equipment configurations, sensitivity levels, operating modes, processing techniques, gain levels, etc.) in order to remediate audio issues (e.g., audio quality levels meeting or exceeding threshold levels associated with a measure of audio quality degradation). Additionally, system actions may include communications (e.g., warnings, error messages, orientation instructions, audio quality visualizations, etc.) regarding audio quality issues and/or potential remediation measures to ameliorate those issues.

Returning to FIG. 5, during execution, feedback manager 506 may manage performance of the system actions including generating and/or delivering communications. The communications may be formulated based on the analysis of audio quality conditions and/or the detection of audio issues by quality monitoring manager 502, as outlined above. Communications may be provided to a participant via a user interface during a video conference. For instance, communications may be presented to a participant via a screen, a speaker, a haptic feedback device, etc. in real-time as they are participating in the video conference from which the audio was captured. As such, the audio quality analysis, categorization, and system action may be occurring in substantially real-time as the video conference is taking place.

For example, audio captures may be collected from the video conferencing area during a video conferencing session. Say that there is random noise detected in the audio captures from the video conferencing area along with speech of a presenting participant. Initially, the audio captured from a presenting participant may have been within an optimal range and speech detection and/or recognition may have been being performed optimally (e.g., the captured audio may be being transcribed into text with a no or low error rate below a threshold error rate). The visual processing of data from a camera feed of the video conference may have been utilized, independently or in combination with audio capture device data, to locate the presenting participant and/or their orientation within the video conference area and/or on the video conference screen. In this instance, the audio quality of the presenting participant may have been initially categorized as being in an audible level 3 category as in table 600 of FIG. 6. As a result, a confirmation of acceptable audio quality may have been communicated to the presenting participant (e.g., on their device or control panel screen) in substantially real-time (e.g., immediately after analysis and determinations were completed and still during the video conference and/or within close temporal proximity to the analyzed speech) as they spoke. Additionally, or alternatively, no errors or warnings may be presented to the presenting participant since the audio quality is within optimal levels.

Then, the ongoing analysis of the audio being subsequently captured from the presenting participant may reveal that the audio quality has degraded. For instance, it may be determined that the current audio levels are outside optimal range thresholds, speech detection is not able to accurately transcribe the captured audio into text at or above a minimum threshold, and/or visual processing of the camera feed may reveal that the presenting participant is still being detected in the video conferencing area and/or in the screen despite these deficiencies (e.g., the detected audio issues are not a result of the presenting participant having simply left the video conferencing area). Consequently, the captured audio may be categorized as having fallen to audible level 5 category. Having transitioned from audible level 3 category to audible level 5 category may cause a higher level of certainty or confidence to be associated with the recategorization.

This transition may trigger the performance of system actions associated with audible level 5 category. Namely, an error message may be generated and/or communicated that informs the presenting participant of the detected audio issues that caused the audio to be categorized into audible level 5. For example, the presenting participant may receive a warning informing them of the poor audio quality.

In addition, orientation instructions may be generated and/or communicated to the presenting participant. The orientation instructions may include suggested modifications to the orientation of the presenting participant, the orientation of other in-room attendees, the orientation of objects, the orientation of video conferencing equipment, and/or settings of the video conference equipment that are predicted to remediate the detected audio issues. For instance, the orientation instructions may include explicit navigation and/or body positioning instructions and/or images that are predicted to remediate the audio issues. As described in greater detail below, the orientation instructions and/or the predictions regarding their ability to remediate an audio issue may be based at least in part on a mapping of the acoustic conditions of the video conferencing area.

During execution, mapping manager 504 may manage audio quality visualization mapping of the acoustic conditions of the conferencing area. For example, an audio quality visualization map may be generated that graphically represents the audio quality conditions detected at each of a plurality of locations of the video conferencing area. This audio quality visualization map for the video conferencing area may be compiled using inputs from the monitoring and analysis of audio quality conditions and/or the detection of audio issues by quality monitoring manager 502, as outlined above. In various embodiments, compiling the audio quality visualization map may include generating a heat map-style visualization of the localization of various audio conditions within the conferencing area during a video conference.

For instance, as a presenting participant participating in a video conference is speaking, multiple data points may be contemporaneously being collected about their speech, as outlined above. These data points may include audio quality data, audio quality categorization data, speaker tracking data, speech recognition data, etc. In addition, data regarding the location and/or orientation of the participant within the video conferencing area while they are vocalizing the captured speech may be being collected. This data may be collected using data from a simultaneously captured camera feed and/or other position sensor data associated with and/or captured contemporaneously with the speech audio capture. For example, a camera and/or other position sensor may be utilized to identify a participant's current location and/or orientation within the video conference area and/or relative to video conferencing equipment while they are producing the speech that is ultimately captured and forms the basis of the audio quality determinations.

Therefore, for each moment of the video conference, data may be collected and/or generated in real-time that characterizes both the audio quality of speech and the location/orientation of a participant producing the speech. It should also be noted that this can be the case for each of the participants in the conferencing area and not necessarily only the presenting participant. That is, feedback process 248 may be executed to monitor multiple participants in a same video conferencing session at once as well as providing each of those multiple participants with personalized real-time audio quality feedback and/or audio quality issue remedial suggestions.

The audio quality, location, and/or orientation data may be tracked and/or compiled over time to generate a visual heat map of acoustic conditions in the video conferencing area. For example, audio quality levels logged for each participant orientation and/or location within the conferencing area can serve as the basis for identifying locations and/or orientations within the video conferencing area that are associated with various levels of audio quality. In some examples, an audio quality visualization map of the video conferencing area may be generated by overlaying the identified locations and/or orientations associated with various audio quality levels on a map of the video conferencing area. For example, a photo, video, or blueprint representation of the video conferencing area may be generated based on input from a user, area feature identification scans, images from cameras, etc. and the audio quality levels discovered for that room may be overlaid in a heat map format on to that representation to produce a heat map of the acoustic conditions for the space.

This mapping may be generated from historical audio quality data captured in the video conferencing area. The historical audio quality data may include data from previous video conferencing sessions in the same video conferencing area and/or data from an ongoing video conferencing session (e.g., the session for which real-time feedback is being provided) within that video conferencing area. Since the audio quality and location and/or orientation data underlying the mapping is collected continuously and/or in real-time during video conferencing sessions, the heat map may be dynamically modified to reflect the current acoustic conditions within the video conferencing area. For example, if there is a change in the position/orientation or audio quality of a participant then this change may be logged, and the heat map may be updated accordingly. Over time, the data gathered provides a map of speaker positions/orientations and their corresponding audio quality levels across the video conferencing area.

The data can be stored and/or incorporated into an audio quality visualization map for specified period of times (e.g., a single video conference session, a day of calls for the video conferencing area, a week of calls for the video conferencing area, a month of calls for the video conferencing area, a year of calls for the video conferencing area, etc.). The resulting audio quality visualization map may be accessible and/or editable by an administrator of video conferencing equipment within the video conferencing area. The administrator may utilize the audio quality visualization map to visually discern and/or diagnose acoustic problem areas or objects and allowing them to trial new placement of speakers, furniture, objects, room layout, etc. over time.

In various embodiments, feedback process 248 may include and/or cooperate with a service (e.g., cloud based) configured to analyze audio quality visualizations, identify potential sources of audio issues, predict remediation measures to ameliorate the audio issue, and/or provide suggested orientation instructions to feedback manager 506. As such, the audio quality visualization map may be automatically or manually submitted to the service to provide suggestions for improvements to the video conferencing area/equipment and/or to the location or orientation of a participant.

The service may utilize an image analysis machine learning model that is trained against common acoustic conditions and/or equipment detection patterns (e.g., microphone pickup patterns). The service may analyze the provide audio quality visualization map and identify audio capturing equipment and its configuration within the video conferencing area by matching audio quality measurement patterns present in the audio quality visualization map to known audio capture patterns associated with particular audio capturing equipment (e.g., a particular microphone with a particular microphone pickup pattern, etc.). In some instances, more data may be submitted with the audio visualization map such as the type of audio equipment and hardware devices used in the video conferencing area or other details.

The service may then utilize its identification and/or modeling of the video conferencing area to identify remedial actions to correct audio issues. For example, the service may identify a modification to the audio capturing equipment, such as a repositioning of the identified microphone that would improve audio for the majority of participants based on how the conferencing area is currently being used. In some instances, the service may employ machine learning analysis to provide suggestions for this positioning, or how the use of additional microphones and their positioning might improve the audio quality of calls. In various embodiments, the service may also identify how a particular participant may relocate and/or reorient their body from their current position to enter an orientation or location in the conference area that it predicts will improve their audio quality based on the acoustic coverage provided by the identified audio capturing equipment. This facilitates identification of a remedial solution based on the acoustic conditions of the room and avoids pitfalls such as simply adjust the gain up to increase the volume of the participants voice, which in many cases (e.g., in a room with high levels of background noise) may simply further degrade audio capture quality.

As previously mentioned, feedback manager 506 may manage the generation and provision of real-time feedback to participants during a video conferencing session and this feedback may be based on the audio visualization map generated by mapping manager 504. For example, the audio visualization map may be utilized to generate and/or provide an orientation instruction that is predicted to mitigate an audio quality issue based on the audio quality visualization map. For instance, a presenting participant's current location within the conferencing area may be determined and/or compared to the audio quality visualization map for the conferencing area. Based on this comparison, an orientation instruction may be identified which, if executed, may cause the presenting participant to reorient toward and/or relocate to a portion of the conferencing area that is indicated as having better acoustic conditions and/or is associated with producing better audio quality per the audio quality visualization map.

For example, based on the comparison, a determination may be made that a presenting participant is located in a region of the video conferencing area associated with poor audio quality that is just outside of a region of the conferencing area indicated as providing optimal audio quality on the audio quality visualization map. Based on this data, it may be predicted that if the participant was instructed to move forward and/or toward the microphone, they would enter that optimal audio quality region likely resolving any identified audio issues. Therefore, an orientation instruction communicating this instruction may be generated and/or provided.

In various embodiments, the orientation instructions may be generated and/or provided in response to detection of an audio issue. For example, the orientation instructions may be generated and/or provided responsive to the monitored audio quality of a participant presenting in a video conferencing session falling below a preconfigured threshold and/or being categorized within a particular audio quality category. That is, the orientation instruction may be part of a system action resulting from categorization of captured audio into a particular audio quality category.

The orientation instruction may be provided to the presenting participant during a video conference via a user interface. For instance, the orientation instruction may be presented to a participant via a screen, a speaker, a haptic feedback device, etc. in real-time as they are participating in the video conference. As such, the determination and/or provision of the orientation instruction may occur in substantially real-time as the video conference is taking place. Therefore, audio issues may be detected live and in real-time during a video conferencing session and remedial feedback to address these issues may be immediately provided and acted upon while the video conferencing session is ongoing.

The orientation instruction may include a suggestion of a reorientation, relocation, reconfiguration, etc. of a presenting participant, other attendees, objects, video conferencing equipment, etc. and/or instructions for completing the same. For example, the orientation instruction may include navigation instructions to a presenting participant suggesting that they "turn to your right," "move forward," "move toward the display," "move toward the microphone," "stand up," "move to the chair on your left," "take two steps to your left," "move across the room," "move away from the group of people on your left," etc.

The audio quality visualization map may be incorporated into and/or supplement the orientation instruction. For example, the current position of the participant who is being instructed to move, the instructions related to their movement, and/or the real-world progress in executing the instructed relocation and/or reorientation may be displayed in conjunction with and/or overlaid on the audio quality visualization map. The current position may be updated as it changes in real-time. In various embodiments, the presenting participant may be able to visualize how they need to reorient and/or where they need to relocate to on the audio quality visualization map.

Additionally, the participant may be able to visualize the progress of their movement or reorientation on the audio quality visualization map. For example, the participant may see a representation of themselves with their location updating in real time overlaid on the audio quality visualization map. As such, they can visually monitor their progress in moving into an area of the audio quality visualization map marked as providing a better audio quality. Further, the presenting participant may receive confirmatory feedback (e.g., a graphic, text, color, map-based communication, etc.) when they have achieved the orientation and/or location suggested in the orientation instruction.

In instances when the presenting participant arrives in the target region or orientation, but continued monitoring of the audio quality from that participant reveals that the audio quality did not improve and/or did not improve to the predicted levels sufficient to resolve the audio issue, additional steps may be taken. Namely, the audio quality visualization map may be updated with the new audio quality-to-location/orientation correlation data and/or additional relocation and/or reorientation instructions may be issued that are predicted to remediate the audio issued based on the updated audio quality visualization map.

Figure 7:
FIG. 7 illustrates an example of an audio quality visualization map associated with audio quality mapping and orientation feedback.

FIG. 7 illustrates an example of an audio quality visualization 700 (e.g., map) associated with audio quality mapping and orientational feedback in video conferencing sessions, according to various embodiments. Audio quality visualization 700 may include a graphical representation of a video conferencing area. More specially, audio quality visualization 700 may be a map of audio detection quality detected within a video conferencing area based on historical quality-to-location/orientation tracking in the video conferencing area.

The video conferencing area may be a conference room where video conference participants gather to participate in a video conferencing session. The video conferencing session may be conducted utilizing a collaboration endpoint 302 and associated video conferencing equipment such as control display 310, audio capture device 312, cameras 308, etc. in the video conferencing area. Some or all of these features, in addition to features such as furniture and/or other objects, may or may not be included in the graphical representation. In some instances, in-room participants of the video concerning session may also be included in the graphical representation and/or their location and/or orientation may be updated in real-time as it is determined.

The audio quality visualization 700 may include graphical representations of localized audio quality conditions. As previously described, these localized audio conditions can be determined based on historical and/or live audio conditions detected in the conferencing area. For example, the localized audio conditions may be based on a compilation of audio conditions detected in various locations of the conferencing area by monitoring participants and/or their speech during video conferencing sessions.

The localized audio conditions may be graphically represented within the audio quality visualization 700 utilizing a graphical heat map pattern, shape, and/or color-coding scheme that is overlaid on the graphical representation of the conferencing area. The heat map overlay may communicate audio quality values associated with the underlying graphically represented regions of the conferencing area.

For example, audio quality visualization 700 may include a graphically defined first set of regions 702 (e.g., 702-1 . . . 702-N) that represent regions of the conferencing area associated with the highest detected level of audio quality (e.g., optimal, best, audible level 3, etc.) for presenting participants in videoconferencing sessions hosted within the video conferencing area. In addition, audio quality visualization 700 may include a graphically defined second set of regions 704 (e.g., 704-1 . . . 704-N) that represent regions of the conferencing area associated with an intermediate detected level of audio quality (e.g., acceptable, audible level 2, etc.) for presenting participants in videoconferencing sessions hosted within the video conferencing area. Further, audio quality visualization 700 may include a graphically defined third set of regions 706 (e.g., 706-1 . . . 706-N) that represent regions of the conferencing area associated with the lowest detected level of audio quality (e.g., unacceptable, poor, audible level 1, etc.) for presenting participants in videoconferencing sessions hosted within the video conferencing area. The audio quality visualization 700 may be analyzed to identify audio issues, used to predict orientation instructions that will remediate the audio issues, and/or provided as part of orientation instructions to facilitate visualization of the instructions.

Figure 8:
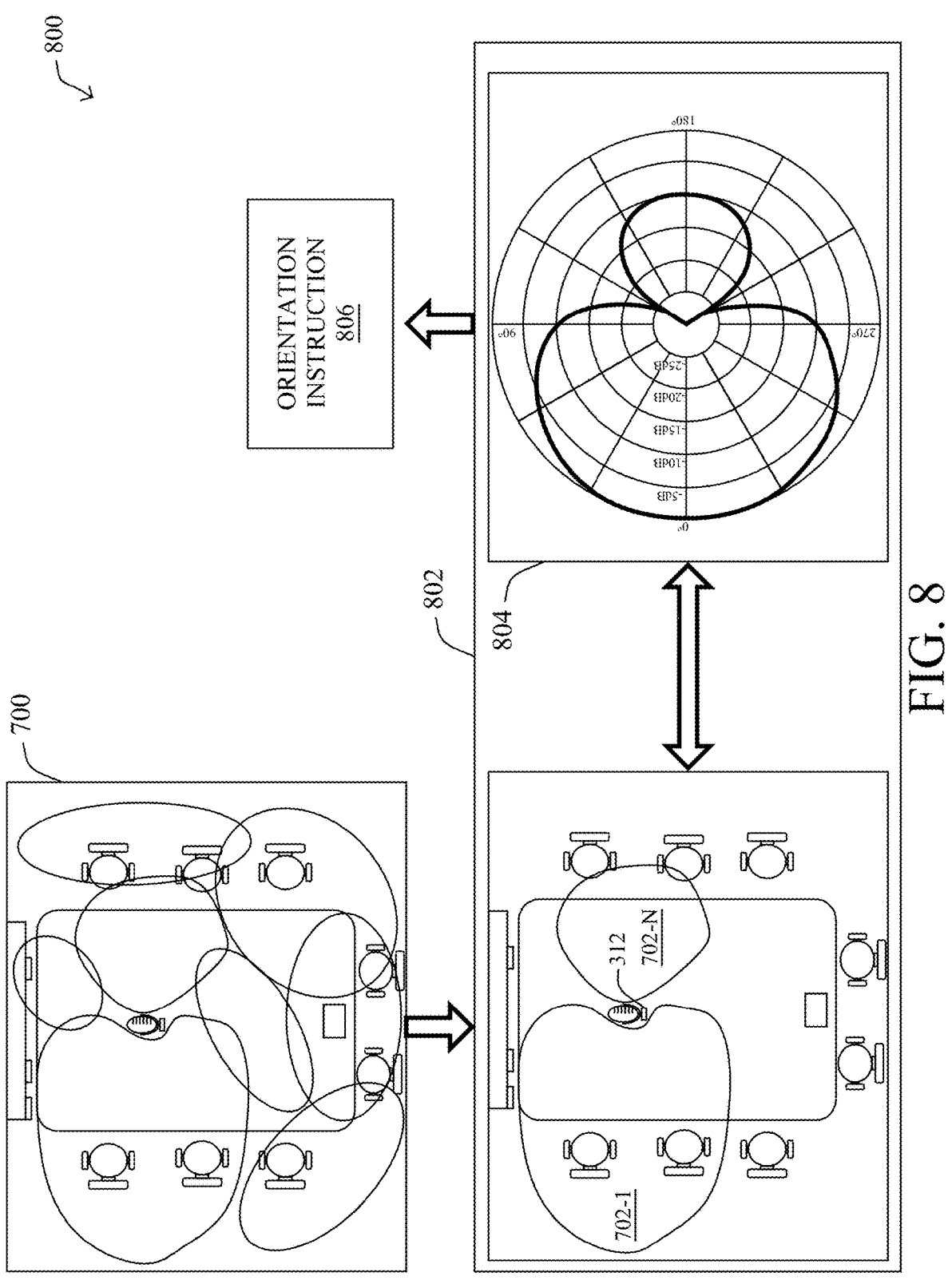
FIG. 8 illustrates an example of an audio quality visualization map analysis process.

FIG. 8 illustrates an example of an audio quality visualization analysis process 800 associated with audio quality mapping and orientational feedback in video conferencing sessions, according to various embodiments. Audio quality visualization analysis process 800 may include analysis of an audio quality visualization 700 that is performed in order to generate an orientation instruction 806.

An audio quality visualization 700 may be submitted to analyzer 802 with current location and/or orientation data for a presenting participant and/or indications of an audio issue being experienced with respect to capturing audio from that presenting participant. This submission may be triggered in response to detecting the audio issue (e.g., monitored audio captures from the presenting participant transitioning from audible level 3 to audible level 5, etc.).

Audio quality visualization 700 may be submitted to an analyzer 802. Analyzer 802 may include application software and/or an analysis service (e.g., cloud-based, etc.). In various embodiments, analyzer 802 may be a component of and/or communicatively coupled to feedback manager 506 of feedback process 248 as described in FIG. 5.

Analyzer 802 may analyze audio quality visualization 700 to predict, based on a current location of a presenting participant within the audio conference area and/or the audio quality regions of the videoconferencing area represented in the audio quality visualization 700, an orientation instruction 806 that would remediate an audio issue currently being detected in a video conferencing session.

In some instances, analyzer 802 may predict the orientation instruction 806 by determining a relocation and/or reorientation from the current location and/or current orientation of the presenting participant. Namely, a relocation and/or reorientation that would relocate and/or reorient that participant to a better and/or closer-to-optimal audio quality region of the conferencing area (e.g., toward and/or into graphically defined first set of regions 702) from their current position.

As such, orientation instruction 806 may include a prompt and/or instructions to a presenting participant to perform the movements necessary to relocate and/or reorient that participant to the better and/or closer-to-optimal audio quality region of the conferencing area. Machine learning models may be utilized by analyzer 802 to predict the orientation instruction 806.

Analyzer 802 may select the better and/or closer-to-optimal audio quality region of the conferencing area that is closest to and/or easiest to get to from the current position of the presenting participant. Further, analyzer 802 may select the better and/or closer-to-optimal audio quality region of the conferencing area that additionally, or alternatively, achieves a best visual framing of and/or focused image of the presenting participant in the video feed for the video conferencing session based on the position and/or field of view of any cameras being utilized in the video conferencing session.

In various embodiments, analyzer 802 may identify and/or locate audio capture device 312 within the video conferencing area by matching audio quality measurement patterns present in the audio quality visualization 700 to known audio capture patterns associated with particular audio capturing equipment. For example, analyzer 802 may identify (e.g., by applying a machine learning model trained in common audio capture device acoustic capture signatures) that the audio quality measurement pattern represented by the graphically defined first set of regions 702 (e.g., 702-1 . . . 702-N) matches a common microphone audio capture pattern 804. As such, analyzer 802 may locate and identify audio capture device 312 as the microphone associated with the common microphone audio capture pattern 804.

The identity and/or location of the microphone may be leveraged in a number of ways. For example, analyzer 802 may be able to predict, based on this knowledge, the audio quality visualization 700, a current location of a currently presenting participant in the video conferencing area, and/or the current location of other participants in the video conferencing area, that moving the audio capture device 312 to the right will likely improve overall audio quality for the video conferencing session. Specifically, it may be able to analyze the available data to predict that this adjustment will shift the pickup zone to the right and therefore shift the zone of optimal audio quality to the right so that is includes participants sitting on the right side of the table. It may further determine that, even with this shift, there is still enough margin of coverage in the optimal audio quality range to retain the participants sitting on the left side of the table within the optimal audio quality zone in its shifted position. In such examples, orientation instructions 806 to this effect may be generated and/or communicated (e.g., "move the microphone eight inches to the right").

Further, analyzer 802 may be able to predict, based on this knowledge, the audio quality visualization 700, a current location of a currently presenting participant in the video conferencing area, and/or the current location of other participants in the video conferencing area, that adding another microphone or changing the settings of the existing microphone may improve the overall audio quality for the video conferencing area. Specifically, analyzer 802 may predict that adding another microphone near the end of the table opposite the collaboration endpoint will serve to incorporate participants sitting at the far end of the table within the optimal audio quality zone. In such examples, orientation instructions 806 to this effect may be generated and/or communicated.

Furthermore, analyzer 802 may be able to predict the source of background noise in the video conferencing area. For instance, analyzer 802 may determine that a group of non-presenting participants are creating background noise that is interfering with audio capture from the presenting participant. Therefore, analyzer 802 may predict that moving away from the source of the background noise and/or taking measures to prevent its capture may remediate audio issues.

As such, analyzer 802 may generate an orientation instruction 806 prompting the presenting participant to move away from the source of background noise (e.g., the group of non-presenting participants, etc.) in the video conferencing area. Further, analyzer may suggest and/or cause disabling of audio collection devices collecting audio proximate the source of the background noise (e.g., cutting the microphone picking up audio from the area of the group of non-presenting participants) as part of the orientation instruction 806. Further still, analyzer 802 may compare audio captures before and/or after the participant moves in order to identify, isolate, and/or cause the digital removal of the background noise from the feed of the video conferencing session.

Figure 9:
FIG. 9 illustrates an example of real0time feedback associated with audio quality mapping and orientational feedback.

FIG. 9 illustrates an example of real-time feedback 906 associated with audio quality mapping and orientational feedback in video conferencing sessions, according to various embodiments. Real-time feedback 906 may be delivered to a presenting participant via a user interface such that it is visible and/or actionable to the presenting participant during their presentation. That is, real-time feedback 906 may be configured to provide real-time solutions to audio issues as they are detected.

Real-time feedback 906 may include an orientation instruction 904. The orientation instruction 904 may include a warning that an audio issue has been detected in the audio capture from the presenting participant. The orientation instruction 904 may include a suggestion to a presenting participant regarding how they should relocate and/or reorient in order to enter a region predicted to offer higher quality audio captures. For example, if the presenting participant is currently located within an intermediate audio quality region (e.g., region 704-N) and a higher quality audio quality region (e.g., region 702-N) is located in front of the presenting participant, then the orientation instruction 904 may suggest that the presenting participant "move forward."

In addition, real-time feedback 906 may include an audio quality visualization 700 for the video conferencing area where the presenting participant is currently participating in the video conferencing. The audio quality visualization 700 may include a graphical representation of the presenting participant 900, as well as graphical representations of non-presenting participants 902 (e.g., 902-1 . . . 902-N) overlaid in their current locations within the video conferencing area. In various embodiments, the audio quality visualization 700 may also heat map style graphical representations of the various audio quality regions associated with various locations within the video conferencing area.

In some instances, the location and/or orientation of the graphical representation of the presenting participant 900 as well as graphical representations of non-presenting participants 902 may be updated in real-time such that they provide a live visualization of where they are located and/or how their movements are affecting their proximity to various audio quality regions mapped on the audio quality visualization 700. Once the presenting participant reaches a targeted audio quality region, the real-time feedback 906 may be updated to reflect their arrival and/or confirm remediation of the audio issue that triggered delivery of the real-time feedback 906 initially.

Figure 10:
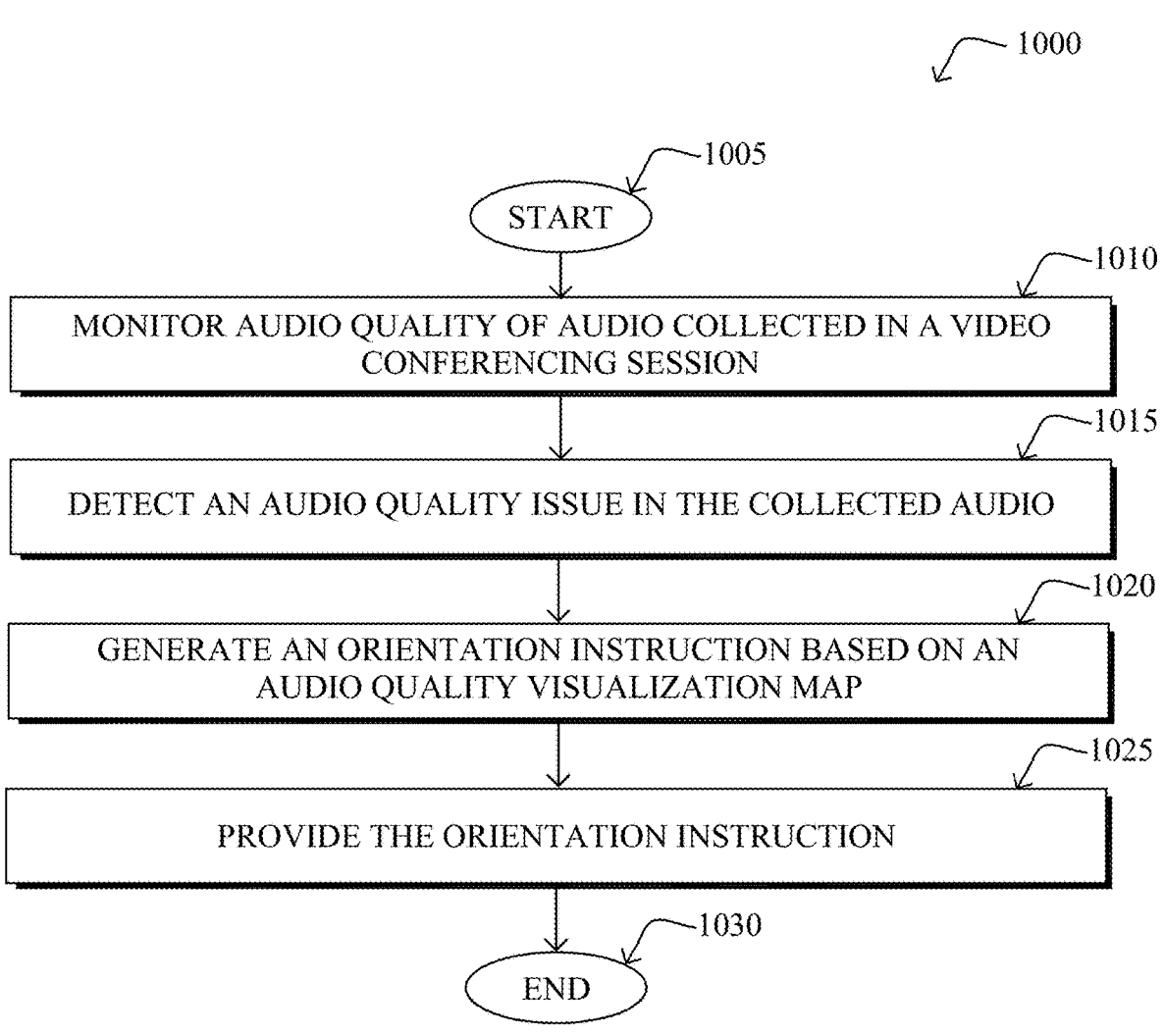
FIG. 10 illustrates an example of a simplified procedure for audio quality mapping and orientational feedback.

FIG. 10 illustrates an example simplified procedure for audio quality mapping and orientational feedback in video conferencing in a network in accordance with one or more embodiments described herein. For example, a non-generic, specifically configured device (e.g., device 200) may perform procedure 1000 by executing stored instructions (e.g., feedback process 248).

The procedure 1000 may start at step 1005, and continues to step 1010, where, as described in greater detail above, audio quality of audio collected from a subject participating in the video conferencing session may be monitored during a video conferencing session in a video conferencing area. In various embodiments, the procedure 1000 may include categorizing the audio quality of the audio collected from the subject participating in the video conferencing session within a range of audio categories based on at least one of audio level data, speech detection data, or subject tracking data.

At step 1015, an audio quality issue for the audio collected from the subject may be detected. The audio quality issue may be detected based on the audio quality of the audio collected from the subject being recategorized from a first audio category in the range of audio categories to a second audio category in the range of audio categories. In some instances, this may involve comparison of the audio collected from the subject to one or more threshold audio quality values.

As detailed above, at step 1020, an orientation instruction that is predicted to mitigate the audio quality issue based on an audio quality visualization map generated from historical audio quality data collected (e.g., in previous video conferencing sessions, in the same video conferencing session being monitored, etc.) in the video conferencing area may be generated. The audio quality visualization map may be a visual heatmap of audio quality values overlaid on a map of the video conferencing area. The historical audio quality data may include audio quality measurements associated with each of a plurality of different locations within the video conferencing area and/or each of a plurality of different participants within the video conferencing area.

The orientation instruction may be predicted to mitigate the audio quality issue based additionally on a position of the subject in the video conferencing area detected during the audio quality issue. For instance, the determined position (e.g., orientation, location, etc.) of a subject within the video conferencing area while the audio quality of audio being captured from them dips below a threshold level relative to positions in the videoconferencing room that have historically provided higher audio quality captures that may remediate this deficiency may be used to formulate instructions to navigate the subject from their current position to the higher quality positions.

In various embodiments, procedure 1000 may involve identifying a source of background noise in the video conferencing area. For instance, objects, participants, feedback, interference, acoustic conditions, etc. contributing to background noise may be identified and/or mapped to the audio quality visualization map. It may be predicted that the source of background noise is contributing to an audio issue within the video conferencing area and/or that creating distance between the subject and the background noise may mitigate the audio issue. As such, the orientation instruction may prompt the subject to move away from a source of background noise in the video conferencing area. In addition, audio collection devices predicted to be collecting audio proximate the source of the background noise and/or otherwise contributing to its capture may be fully or partially disabled and/or reconfigured to reduce the amount of background noise being captured by the system.

Additionally, procedure 1000 may include identifying audio capturing equipment within the video conferencing area. This identification may be accomplished by matching audio quality measurement patterns present in the audio quality visualization map to known audio capture patterns associated with particular audio capturing equipment. Once identified, the orientation instruction may include a suggested modification to the identified audio capturing equipment.

At step 1025, the orientation subject may be provided to the subject. The orientation instruction may prompt the subject to change their physical orientation within the video conferencing area. The orientation instruction may include explicit navigation instructions that, if executed by the subject, would result in a change to their physical orientation within the video conferencing area that is predicted to remediate audio issues.

For example, the orientation instruction may suggest to the subject that they change the way that they are facing and/or otherwise physically oriented relative to video conferencing equipment, other objects, other participants, regions of the video conferencing area, etc. The orientation instruction may suggest the same with respect to an object and/or item of video conferencing equipment (e.g., a microphone, etc.). In various embodiments, the orientation instruction may include a suggest regarding suggested settings or configurations to be applied to video conferencing equipment as well as the potential addition or subtracting of video conferencing equipment to the video conferencing environment.

In various embodiments, the orientation instruction may also present the audio quality visualization map to the subject as part of the orientation instruction. In some instances, the audio quality visualization map may be configured to direct and/or track progress of a suggested change to a participant's physical orientation within the video conferencing area. As such, a live/persistently updated graphical representation of the subject may be overlaid on the audio quality visualization map.

The orientation instruction may be presented as real-time feedback to a presenting participant as they are presenting in a video conferencing session. For instance, a presenting participant may be speaking as the presenter in a video conferencing session the audio being captured from his/her speech may dip below a threshold quality level. This audio issue may be detected in real-time as the presenter is speaking and/or real-time feedback including orientation instructions may be presented to the participant on a screen that they are referencing during the video conferencing session. In this manner, the presenting participant may be discretely made aware of audio issues as they crop up during their presentation and they may be immediately provided with simple orientation instructions predicted to remediate these issues without interruption to their presentation.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, facilitate audio quality mapping and real-time orientational feedback in video conferencing. These techniques can be leveraged to dynamically compile data to formulate a complete understanding of the acoustic characteristics of a conferencing area. This understanding can be used to construct an audio quality visualization map of the video conferencing area. This map of audio detection quality can be leveraged to make predictions about potential remedial actions to address audio issues and/or as an aide in delivering orientation instructions. All of these operations can be performed during a video conferencing session. As such, the techniques automatically generate and discreetly deliver real-time audio issue identifications and/or remedial instruction to presenters during a video conferencing session.

According to the embodiments herein, an illustrative method herein may comprise: monitoring, by a device and during a video conferencing session in a video conferencing area, audio quality of audio collected from a subject participating in the video conferencing session; detecting, by the device and based on the audio quality, an audio quality issue for the audio collected from the subject; generating, by the device, an orientation instruction predicted to mitigate the audio quality issue based on an audio quality visualization map generated from historical audio quality data in the video conferencing area; and providing, by the device and during the video conferencing session, the orientation instruction to the subject.

In one embodiment, the method further comprises categorizing the audio quality of the audio collected from the subject participating in the video conferencing session within a range of audio categories based on at least one of audio level data, speech detection data, or subject tracking data. In one embodiment, the method further comprises detecting the audio quality issue based on the audio quality of the audio collected from the subject being recategorized from a first audio category in the range of audio categories to a second audio category in the range of audio categories. In one embodiment, the audio quality visualization map is a visual heatmap of audio quality values overlaid on a map of the video conferencing area. In one embodiment, the orientation instruction prompts the subject to change their physical orientation within the video conferencing area. In one embodiment, the orientation instruction presents the audio quality visualization map to the subject to direct a change to their physical orientation within the video conferencing area.

In one embodiment, the orientation instruction is predicted to mitigate the audio quality issue based additionally on a position of the subject in the video conferencing area detected during the audio quality issue. In one embodiment, the historical audio quality data includes audio quality measurements associated with each of a plurality of different locations within the video conferencing area. In one embodiment, the orientation instruction prompts the subject to move away from a source of background noise in the video conferencing area. In one embodiment, the method further comprises disabling audio collection devices collecting audio proximate the source of the background noise. In one embodiment, the method further comprises identifying audio capturing equipment within the video conferencing area by matching audio quality measurement patterns present in the audio quality visualization map to known audio capture patterns associated with particular audio capturing equipment; and including in the orientation instruction a suggested modification to the audio capturing equipment.

According to the embodiments herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: monitor, during a video conferencing session in a video conferencing area, audio quality of audio collected from a subject participating in the video conferencing session; detect, based on the audio quality, an audio quality issue for the audio collected from the subject; generate an orientation instruction predicted to mitigate the audio quality issue based on an audio quality visualization map generated from historical audio quality data in the video conferencing area; and provide, during the video conferencing session, the orientation instruction to the subject.

According to the embodiments herein, an illustrative tangible, non-transitory, computer-readable medium having computer-executable instructions stored thereon that, when executed by a processor on a computer, cause the computer to perform a method comprising: monitoring, during a video conferencing session in a video conferencing area, audio quality of audio collected from a subject participating in the video conferencing session; detecting, based on the audio quality, an audio quality issue for the audio collected from the subject; generating an orientation instruction predicted to mitigate the audio quality issue based on an audio quality visualization map generated from historical audio quality data in the video conferencing area; and providing, during the video conferencing session, the orientation instruction to the subject.

While there have been shown and described illustrative embodiments that provide for audio quality mapping and real-time orientational feedback in video conferencing, it is to be understood that various other adaptations and modifications may be made within the spirit and scope of the embodiments herein. For example, while certain embodiments illustrate audio quality mapping with a certain perspective (e.g., overhead view, etc.) other perspectives are also contemplated. Further, while certain embodiments are described with respect to certain orientation instructions, other types of instructions and instruction delivery are also contemplated.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
 monitoring, by a device and during a video conferencing session in a video conferencing area, audio quality of audio collected from a subject participating in the video conferencing session;

detecting, by the device and based on the audio quality, an audio quality issue for the audio collected from the subject;

generating, by the device, an orientation instruction predicted to mitigate the audio quality issue based on an audio quality visualization map generated from historical audio quality data in the video conferencing area, the map spatially correlating the historical audio quality data with corresponding locations in the video conferencing area; and providing, by the device and during the video conferencing session, the orientation instruction to the subject.

2. The method as in claim 1, further comprising:

categorizing the audio quality of the audio collected from the subject participating in the video conferencing session within a range of audio categories based on at least one of audio level data, speech detection data, or subject tracking data.

3. The method as in claim 2, further comprising:

detecting the audio quality issue based on the audio quality of the audio collected from the subject being recategorized from a first audio category in the range of audio categories to a second audio category in the range of audio categories.

4. The method as in claim 1, wherein the audio quality visualization map is a visual heatmap of audio quality values overlaid on a map of the video conferencing area.

5. The method as in claim 1, wherein the orientation instruction prompts the subject to change their physical orientation within the video conferencing area.

6. The method as in claim 1, wherein the orientation instruction presents the audio quality visualization map to the subject to direct a change to their physical orientation within the video conferencing area.

7. The method of claim 1, wherein the orientation instruction is predicted to mitigate the audio quality issue based additionally on a position of the subject in the video conferencing area detected during the audio quality issue.

8. The method of claim 1, wherein the historical audio quality data includes audio quality measurements associated with each of a plurality of different locations within the video conferencing area.

9. The method of claim 1, wherein the orientation instruction prompts the subject to move away from a source of background noise in the video conferencing area.

10. The method of claim 9, further comprising:

disabling audio collection devices collecting audio proximate the source of the background noise.

11. The method of claim 1, further comprising:

identifying audio capturing equipment within the video conferencing area by matching audio quality measurement patterns present in the audio quality visualization map to known audio capture patterns associated with particular audio capturing equipment; and including in the orientation instruction a suggested modification to the audio capturing equipment.

12. An apparatus, comprising:

one or more network interfaces to communicate with a network;

a processor coupled to the one or more network interfaces and configured to execute one or more processes; and a memory configured to store a process that is executable by the processor, the process, when executed, configured to:

monitor, during a video conferencing session in a video conferencing area, audio quality of audio collected from a subject participating in the video conferencing session;

detect, based on the audio quality, an audio quality issue for the audio collected from the subject;

generate an orientation instruction predicted to mitigate the audio quality issue based on an audio quality visualization map generated from historical audio quality data in the video conferencing area, the map spatially correlating the historical audio quality data with corresponding locations in the video conferencing area; and provide, during the video conferencing session, the orientation instruction to the subject.

13. The apparatus as in claim 12, the process further configured to:

categorize the audio quality of the audio collected from the subject participating in the video conferencing session within a range of audio categories based on at least one of audio level data, speech detection data, or subject tracking data.

14. The apparatus as in claim 13, the process further configured to:

detect the audio quality issue based on the audio quality of the audio collected from the subject being recategorized from a first audio category in the range of audio categories to a second audio category in the range of audio categories.

15. The apparatus as in claim 12, wherein the audio quality visualization map is a visual heatmap of audio quality values overlaid on a map of the video conferencing area.

16. The apparatus as in claim 12, wherein the orientation instruction prompts the subject to change their physical orientation within the video conferencing area.

17. The apparatus of claim 12, wherein the orientation instruction presents the audio quality visualization map to the subject to direct a change to their physical orientation within the video conferencing area.

18. The apparatus of claim 12, wherein the orientation instruction is predicted to mitigate the audio quality issue based additionally on a position of the subject in the video conferencing area detected during the audio quality issue.

19. The apparatus of claim 12, wherein the historical audio quality data includes audio quality measurements associated with each of a plurality of different locations within the video conferencing area.

20. A tangible, non-transitory, computer-readable medium having computer-executable instructions stored thereon that, when executed by a processor on a computer, cause the computer to perform a method comprising:

monitoring, during a video conferencing session in a video conferencing area, audio quality of audio collected from a subject participating in the video conferencing session;

detecting, based on the audio quality, an audio quality issue for the audio collected from the subject;

generating an orientation instruction predicted to mitigate the audio quality issue based on an audio quality visualization map generated from historical audio quality data in the video conferencing area, the map spatially correlating the historical audio quality data with corresponding locations in the video conferencing area; and providing, during the video conferencing session, the orientation instruction to the subject.

* * * * *